Dec. 3, 1963  J. B. MINTER  3,113,275
PRECISION REGULATED HIGH VOLTAGE SOURCE
Filed Dec. 23, 1960  2 Sheets-Sheet 1

INVENTOR
JERRY B. MINTER
BY John J. Rogan
ATTORNEY

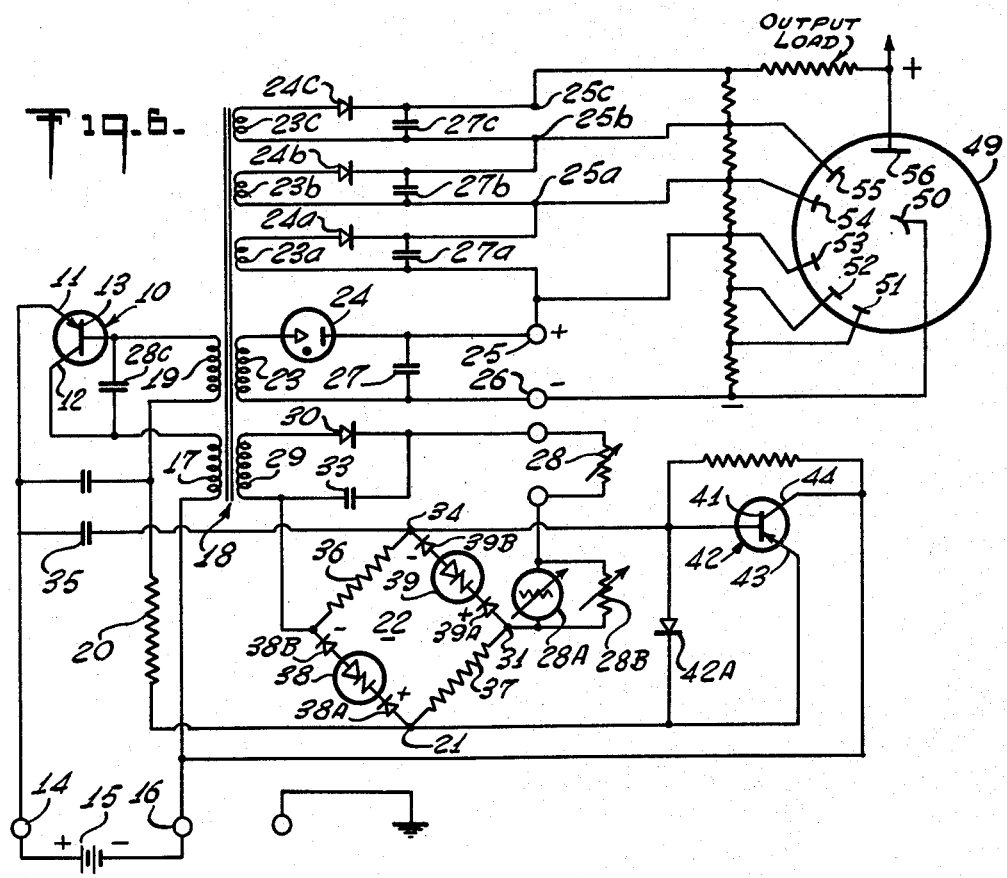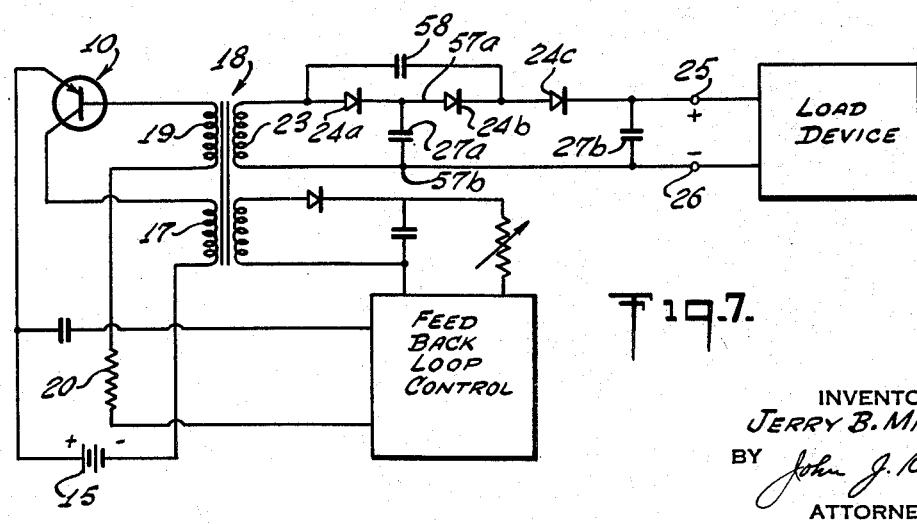

United States Patent Office 3,113,275
Patented Dec. 3, 1963

3,113,275
PRECISION REGULATED HIGH VOLTAGE
SOURCE
Jerry B. Minter, Normandy Heights Road,
Morristown, N.J.
Filed Dec. 23, 1960, Ser. No. 77,982
15 Claims. (Cl. 331—109)

This invention relates to direct current high voltage generators and more particularly it relates to such generators which are precisionally stabilized or self-regulated.

In various technological fields it is highly desirable to have a source of high voltage direct current which is light in weight, occupies a minimum of volumetric space for a given range of output voltage and which possesses a high order of precision voltage regulation. It has been proposed heretofore to use an oscillator which is supplied with energy from relatively low voltage source such for example as a six volt battery, and the oscillations are rectified to produce the desired output direct current voltage. One of the draw-backs of such prior arrangements has been the unavoidable waste of power either in the oscillator per se or in the rectifier and regulating circuits associated therewith. Furthermore, when such prior sources have been provided with self-regulating circuits, the regulating circuits themselves have been such as to consume considerable power.

Accordingly one of the principal objects of this invention is to provide an arrangement for generating high voltage direct current, which arrangement is compact, light in weight, is self-regulating with a high order of precision, and which consumes a minimum of power in the various sections such as in the oscillator section, the rectifier section, and the self-regulating section.

Another object is to provide a self-regulating high voltage direct current source which derives its output energy from a relatively small light-weight battery, and employing a novel self-regulating circuit which requires a minimum of power to achieve the self-regulating action.

A further feature is to provide a direct current voltage source employing an oscillator of the transistor kind, in conjunction with a voltage regulating control employing as the control elements thereof a pair of Zener diodes, or other diodes having a precision conductance characteristic similar to that of a Zener diode, sometimes referred to as avalanche diodes.

A feature of the invention relates to a self-regulating high voltage direct current source employing a novel combination of transistor oscillator, cold cathode gas rectifier tube, and a closed loop servo circuit employing Zener diodes to acheive the necessary regulation control voltage with a minimum of power dissipation.

Another feature relates to a novel combination of a transistor oscillator, a rectifier, and a voltage regulator whereby there are produced a series of individually regulated high direct current voltages having fixed ratios but which are adjustable over a predetermined range so that they can be used to excite a number of stages of a load device, such for example as the stages of a photomultiplier with very little bleeder current required for the photomultiplier stages.

A further feature relates to the novel organization, arrangement and relative location and interconnection of parts which cooperate to provide an improved light-weight, compact, high voltage, direct current source having a high order of input power efficiency.

Other features and advantages will become apparent after a consideration of the following detailed descriptions, the appended claims and the attached drawing.

In the drawing,

FIG. 6 is a schematic wiring diagram of a modification of FIG. 1;

FIG. 7 is a schematic diagram of a further modification of FIG. 1.

Figure 1:
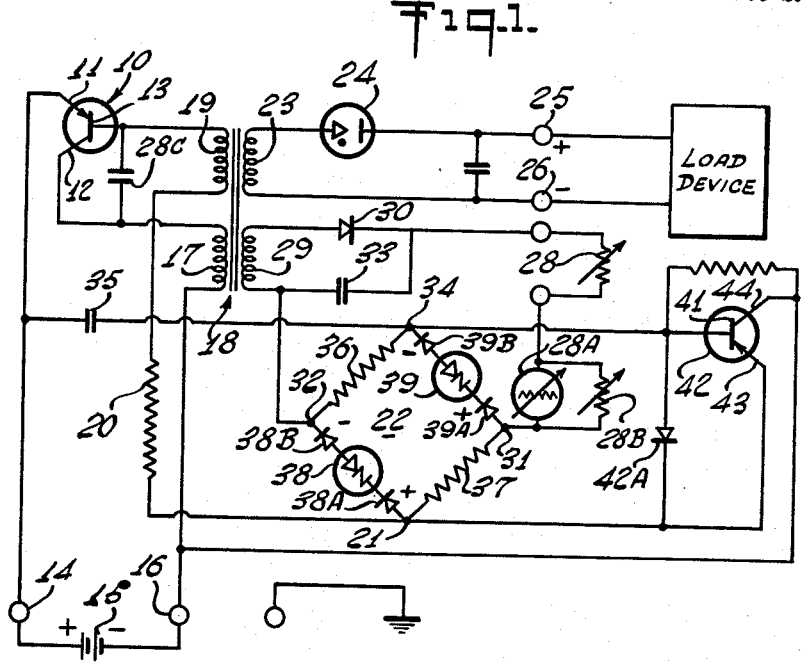
FIG. 1 is a schematic wiring diagram of a typical arrangement embodying the invention.

In FIG. 1 of the drawing, the numeral 10 represents a transistor having the usual emitter 11, collector 12 and base electrode 13. The emitter 11 is connected to the positive terminal 14 of a low voltage light-weight source such as a miniature battery 15 whose negative terminal 16 is connected to the collector 12 through a primary winding 17 of a transformer 18. The transformer should preferably be of the kind having a ferrite or high frequency iron core. Transformer 18 has another primary winding 19 which is connected from the base 13 through the base current limiting resistor 20 and thence to the point 21 of the regulator network 22 which will be described hereinbelow. Thus, the bias on base 13 is determined by the potential at point 21.

Windings 17 and 19 are so wound that they are in oscillation-sustaining feed back relation with respect to the collector current and base current of transistor 10. Transformer 18 has a secondary winding 23 which is connected in series with a rectifier 24, to the direct current output terminals 25, 26, and thence to the terminals of any suitable load device. A suitable by-pass condenser 27 is connected across terminals 25, 26 to filter out any ripples that may appear in the rectifier voltage. In one arrangement that was found to produce the desired results, the battery 15 was a six volt battery and the primary winding 19 had sixty turns while the secondary winding 23 had eight thousand turns and produced at the terminals 25, 26 a direct current voltage of from nine hunder to twelve hundred volts depending upon the setting of the adjustable control resistor 28.

Transformer 18 has another secondary winding 29 which is connected in series with a rectifying diode 30, the manually adjustable control resistor 28, and the points 31, 32 of the regulating network 22. A suitable capacitor 33 is connected across the secondary winding 29 and the diode 30 to filter out any undesirable ripples in the rectified voltage. The terminal 34 of the regulator network is connected through capacitor 35 to the emitter 11.

Figures 2, 3:
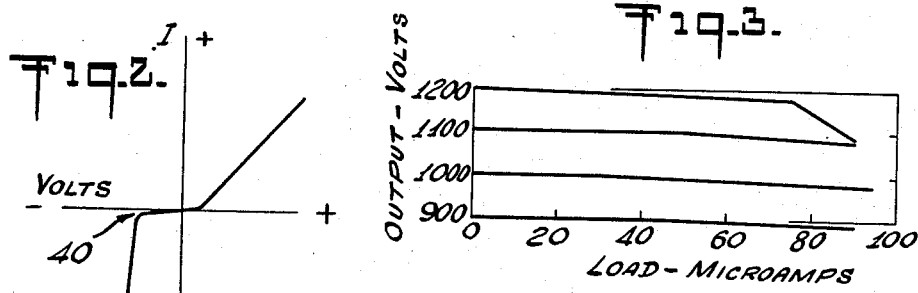
FIG. 2 is a characteristic curve of a Zener diode used in explaining the invention.
FIG. 3 is a typical set of regulating characteristics of the system shown in FIG. 1.

The network 22 is, in accordance with the invention, constituted of what may be termed a bridge consisting of balancing resistors 36, 37, Zener diodes 38, 39, and preferably also temperature-compensating diodes 38A, 39A, 38B, 39B. According to the invention, the Zener diodes are biased so that they operate only at or closely adjacent the curved or knee portion 40 of the characteristic curve between voltage and current, as illustrated in FIG. 2. In this region the Zener diode passes very little current and yet it is possible to control the bias on the base electrode 13 of transistor 10 so as to control the frequency and duty cycle thereof. The point 34 of the regulator network is also connected to the base electrode 41 of a power amplifying transistor 42 whose emitter 43 is connected to the point 21 of the network and whose collector 44 is connected through the feed back winding 17 to the collector 12 of the transistor oscillator 10. As indicated in the drawing, the Zener diodes 38, 39 are connected so that they avalanche in the reverse direction respectively from the point 32 to the point 21 and from the point 34 to the point 31. In order to prevent anti-blocking of the oscillator, a diode clamp 42A is provided. The diode 42A prevents excessive positive surges at the base 41 with respect to emitter 43, which may occur during starting, for example on low input voltage, etc., caused by a weak battery 15.

In the foregoing arrangement, the secondary winding 29 is a sampling or low voltage winding and it may have approximately one hundred turns, while the feed back winding 17 may also have one hundred turns. Thus, a sample of the generated oscillations is rectified by rectifier 30 and appears as what may be termed an error detection signal across the points 21 and 34 of network 22. The diode 30, therefore, rectifies a relatively low voltage and is in continuous operation during each duty cycle of the oscillations from oscillator 10. The rectifier 24 is of any well known type having a high inverse voltage.

The manner of operation of the above described system in achieving the necessary voltage regulation is believed to be along the following lines. When the battery circuit 15 is first closed the base electrode 13 is biased so that the oscillations build up in amplitude in the well known manner as a result of the feed back relation between windings 17 and 19. The frequency of these oscillations will be a function of the inductance of the winding 19 and the associated distributed capacitances. Because of the very high feed back, blocking oscillations occur. However, since the output voltage at terminals 25 and 26 is relatively high, for example as high as nine hundred volts, the winding 23 should be wound with the necessary protection against voltage break-down and with a minimum of distributed capacitance between the turns. With no load connected to the terminals 25, 26, the oscillator may, for example, block at a frequency of 3500 cycles. This will be represented by a rectified voltage at the terminals 31, 32 of a predetermined value, for example of fifteen volts. As the load at terminals 25, 26 increases, because of the tight coupling between windings 19 and 23, it is reflected as a load in the oscillatory circuit of transistor 10 which, therefore, operates at a lower level which, in effect, reduces the amplitude of the sampled blocking oscillations. The sampled blocking oscillations rectified by diode 30 are impressed across the terminals 31, 32 of the regulating network 22 to produce a change in potential across the terminals 21, 34 whereby the bias on the base electrode 13 is changed so as to increase the base current and therefore to increase the induced voltage in the winding 23. This action, therefore, is self-regulating and maintains the terminals 25 and 26 at their intended direct current potential previously determined by the setting of resistor 28.

Figure 4:
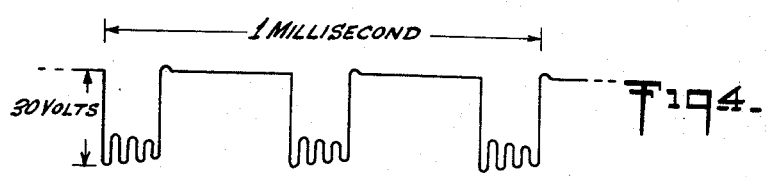
FIGS. 4 and 5 are respective wave diagrams used in explaining the invention.
Figure 5:
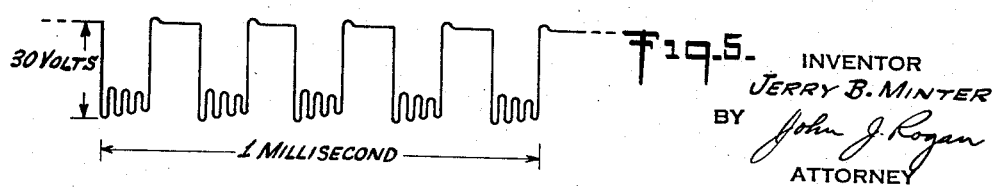

The oscillator 10 with its associated feed back circuits is in effect a self-blocking oscillator whose blocking frequency or duty cycle varies with the load current. Thus, FIG. 4 shows the duty cycle as shown for a typical normal load current, while FIG. 5 shows the duty cycle for a much lighter load current. From these figures it will be seen that the frequency of blocking varies indirectly with the load current. The small variations, which for example may be of the order of two hundred kc. alternating current are filtered out before reaching the load. For that purpose a suitable capacitor 28C is provided.

It should be observed that the regulating action of the network 22 is controlled primarily by the Zener diodes 38, 39 which are biased so that they always operate at or near the knee portion 40 of their characteristic curves at which points they pass extremely small currents with the result that very little power is wasted in the regulating network. More precise regulation, to compensate for temperature changes, is provided by the additional four diodes 38A, 39A, 38B, 39B, which are chosen for their sensitivity to temperature change, and need not be used as Zener diodes. Temperature stabilization is accomplished first by the four junction diodes or stabistors 38A, 38B, 39A, 39B connected in the forward direction as compared with the negative avalanching direction of the Zener diodes to produce a forward drop, for example of approximately 0.3 volt each, where these diodes are of the germanium kind. This set of voltage drops will increase with increasing temperature, thus tending to compensate for the rise in the bias necessary to operate transistors 42 and 10 at the higher temperature. The four stabistor diodes may be similar to the type 1N91. For compensation at temperatures above 100 degrees F., it may be necessary to insert a thermistor 28A in series with the manual control resistance 28. If desired, this thermistor can be shunted by a manually adjustable resistor 28B to accomplish the desired degree of high temperature correction. Compensation to within one percent has thus been accomplished up to over 140 degrees F. by proper adjustment of the thermistor shunt, and by choosing stabistors 38A, 38B, 39A, 39B which have a forward voltage drop vs. temperature change characteristic substantially the same as that of the transistors 10 and 42.

FIG. 3 shows a typical series of graphs illustrating the regulating characteristic of the system of FIG. 1, showing the relation between the load at terminals 25, 26 in microamperes and the output voltage at those terminals. One of the important advantages of the closed loop servo regulating network as shown, is that it is relatively independent of temperature changes, since the changes affecting one Zener diode are offset by the corresponding changes in the other Zener diode. In fact, with normal temperature ranges and moderate changes in load at terminals 25, 26, the arrangement can easily maintain 0.1 percent regulation, and it was found that the resistance 28 can be manually varied from 20,000 ohms to a few thousand ohms, to produce at the output terminals 25, 26 any desired stabilized direct current voltage between approximately 1200 and 900 volts. Once this voltage is set, it will remain quite stable with respect to input and output load variations. It should also be observed that the system retains its precision regulating action for substantial changes in the voltage of the battery 15. Summarizing the above, the regulation of the system is accomplished by the closed loop servo action of the diode bridge 22 producing reference potentials formed by Zener diodes 38, 39, which are supplied from the separate sampling winding 29 and diode rectifier 30. The differential output of bridge 22 is amplified by transistor 42 and controls the bias on the base of the power transistor 10.

Another outstanding advantage of the direct current source shown in FIG. 1 is that the transformer 18 can be provided with a series of secondary windings similar to winding 23 and each associated with a respective rectifier and filter to provide at a corresponding set of terminals respective voltages of different values. Such an arrangement is particularly useful for a number of devices which require different voltages at a plurality of different points. I have found that the direct current source according to the invention is peculiarly useful in supplying precisely regulated voltages to the various electron multiplier stages of any well known multiplier phototube system. Such a system is shown in FIG. 6 wherein the parts which function the same as those of FIG. 1 are designated by the same numerals in both figures.

The transformer 18 in addition to the secondary winding 23 is provided with a series of similar secondary windings 23a, 23b, 23c, each provided with a rectifier 24a, 24b, 24c and respective filter capacitors 27a, 27b, 27c to develop at the corresponding terminals 25a, 25b, 25c, the desired direct current potential. As shown, these rectified outputs are connected in series to provide a corresponding series of voltage taps at the points 25a, 25b, 25c. The potential at each tap will be determined by the number of turns on the associated secondary winding 23, 23a, 23b, 23c.

The numeral 49 represents schematically any well known multiplier phototube having a primary electron emitting cathode 50, and a series of electron multiplier anodes 51–55, and a final collector anode 56. It will be understood, of course, that a greater or less number of multiplier stages may be incorporated in the tube. As is well known in the operation of such a tube, the electron flow from the successive multiplier stages increases from stage to stage, and yet it is necessary to maintain a fixed voltage ratio between the various stages, and this ratio should be substantially independent of the output load current. Heretofore it has been the usual practice to connect a bleeder resistor chain across the positive and negative terminals of the direct current power supply, and to connect the various multiplier electrodes to the proper voltage taps on the bleeder chain. It was found that the current through the bleeder chain varies with the secondary electron current at each electrode. For that reason it was necessary to compromise in the maximum value of the bleeder chain resistance. In any case, heretofore the tendency of the bleeder taps to vary in voltage with the load current was always present. By using a precisely regulated direct current source according to the invention it is possible to use a bleeder resistor chain of extremely high resistance so as to maintain the voltage ratio at the various multiplier stages of respectively fixed values and substantially independent of the bleeder current. In addition, a particular type of multiplier phototube may actually lose gain at the higher temperatures, necessitating the raising of the applied voltage. In one practical case, for example, it was necessary to raise the voltage by 2½ percent at an operating temperature of 125 degrees F. to secure constant gain. This result can be readily accomplished according to the invention by proper adjustment of the shunt 28B around the thermistor 28A. It has also been found that this better thermal balance of the system can be maintained if the thermistor 28A is mounted in close thermal contact with respect to the transistor 42.

Furthermore, with the stepped voltage source of FIG. 6 it is possible to ground any desired one of the output terminals 25, 25a, etc., for ground reference purposes depending upon the grounding conditions required for the associated load device. Thus, while in FIG. 6 it is desirable to ground the cathode 50 and the terminal 26, in other types of load devices it may be desirable to produce voltage steps having a fixed voltage ratio above and below ground. Thus, any one of the terminals 25, 25a, etc., may be the grounded terminal of the system.

FIG. 7 shows a modification of FIGS. 1 and 6 wherein the high voltage rectifier 24, for example, is replaced by a series of low voltage rectifiers or diodes connected in so-called voltage doubling relation. For example, the diode 24a may develop across points 57a, 57b a direct current voltage of 2 kilovolts. The junction between the additional diodes 24b, 24c may be connected to the winding 23 through a suitable capacitor 58, for example of 0.01 mfds. so that there is developed across the terminals 25, 26 a 4 kilovolt direct current supply. Suitable by-pass or filter condensers 27a, 27b are, of course, provided.

Various changes and modifications can be made in the disclosed embodiments without departing from the spirit and scope of the invention.

What is claimed is:

1. A source of precisely regulated high voltage direct current for connection to a load, comprising a transistor blocking oscillator, a rectifier, a transformer for coupling said rectifier in tightly coupled relation to the oscillatory output of said oscillator whereby variations in said load are reflected as frequency changes in said oscillations, means to sample a portion of the energy of said oscillations, a Zener diode bridge, means to apply said sampled oscillations to said bridge to produce an oscillator blocking control voltage which is proportional to variation in said load, and means to apply said control voltage to said oscillator to cause it to vary its frequency in accordance with increases in said load and thereby to maintain a fixed predetermined voltage applied to said load, said bridge comprising two sets of diagonally related conjugate points, a first pair of ratio arms interconnecting the first set of conjugate points, a second pair of ratio arms interconnecting the second set of conjugate points, a ratio arm of each pair including a Zener diode and at least one series-connected temperature-compensating rectifying diode.

2. A source of precisely regulated high voltage direct current according to claim 1 in which the means for sampling said oscillations includes an additional secondary winding on said transformer, and an adjustable resistance connected between said sampling secondary winding and said bridge to adjust the voltage applied to the load to a predetermined fixed value.

3. A source of precisely regulated high voltage direct current according to claim 1 in which there are provided means applying said rectified sampling voltage as an error detection voltage across one pair of diagonal points of the bridge, and means connecting the remaining pair of diagonal points of the bridge across the electrodes of the oscillator to vary the frequency of the oscillations in accordance with said variations of the load.

4. A source of precisely regulated high voltage direct current according to claim 3 in which said bridge forms a closed loop servo feed back between said sampling winding and said oscillator.

5. A source of precisely regulated high voltage direct current according to claim 4 in which said closed loop servo bridge reduces the frequency of the generated oscillations in accordance with increases in the load current.

6. A source of precisely regulated high voltage direct current according to claim 3 in which the means for applying said control voltage to said oscillator includes a transistor amplifier whose output is connected to said transistor oscillator to control the blocking frequency thereof.

7. A source of precisely regulated high voltage direct current according to claim 3 in which the Zener diodes are biased under control of the sampled oscillations so that the operation of each is confined to the region adjacent the respective knee portion of its voltage-current characteristic curve, and said Zener diodes are poled so as to avalanche in a direction opposite to the conductive direction of the associated series-connected rectifier diode.

8. A direct current high voltage source with precise regulation, comprising a primary low voltage direct current supply, a transistor oscillator generator having feed back windings interconnecting its various electrodes to cause the oscillator to generate blocking oscillations, a transformer having a step-up secondary winding, at least one of said feed back windings constituting a primary winding of said transformer, said transformer having an additional oscillation sampling secondary winding, a high voltage rectifier for rectifying the voltage from said step-up winding, another rectifier for rectifying the voltage from said sampling winding to produce an oscillation sampling voltage, a voltage regulating network including at least one variable impedance arm comprising in series at least one temperature-compensating rectifying diode and at least one Zener diode which is biased under control of said rectified sampling voltage to cause said Zener diode to operate adjacent the knee portion of its voltage-current characteristic curve, and circuit connections from said network to said oscillator to adjust the bias on the base electrode of said oscillator under control of said Zener diode and thereby to maintain the said direct current voltage from said source at a precisely regulated value.

9. A source according to claim 8 in which said transformer has a series of additional step-up secondary windings and respective rectifiers for producing a series of output precisely regulated voltages having predetermined voltage ratios.

10. A transistor oscillator control system, comprising a transistor oscillator, means to bias the base electrode of the transistor with respect to its emitter electrode to produce oscillations of a given frequency at a given temperature of the transistor, means to rectify a sample of the oscillations, said bias means including at least one variable impedance comprising in series at least one temperature-compensating rectifying diode and at least one Zener diode which is connected to operate in the region of the knee portion of its avalanching characteristic curve, and at least one junction diode connected in series with said Zener diode and connected to conduct in a direction opposite to the avalanching direction of said Zener diode, and a balancing network one arm of which includes said variable impedance to produce in conjunction with the rectified sampled oscillations a bias voltage for the base electrode of said transistor which bias voltage varies with temperature change of the transistor.

11. A transistor oscillator control system according to claim 10 in which said network is a balancing bridge having a pair of opposite balancing arms each including in series a Zener diode which is connected between a pair of junction diodes, each pair of said junction diodes being connected to conduct in the opposite direction to the avalanching direction of the intervening Zener diode.

12. A transistor oscillator control system according to claim 11 in which a thermistor is connected between said bridge and the said rectified sampled oscillator output.

13. A transistor oscillator control system according to claim 12 in which a manually variable resistor is connected in series with said thermistor, and another manually variable resistor is connected in shunt to said thermistor.

14. A transistor oscillator control system according to claim 11 in which a transistor amplifier has its base and emitter electrodes connected to opposite conjugate points of said bridge, and the collector electrode of said amplifier is connected through an oscillator feed-back circuit to said transistor oscillator.

15. A transistor oscillator control system according to claim 14 in which said oscillator is of the self-blocking type, and a clamping diode is connected across the base and emitter electrodes of said amplifier to prevent excessive positive surges at the base electrode of said amplifier with respect to its emitter electrode which surges would tend to prevent self-blocking of the transistor oscillator.

References Cited in the file of this patent

UNITED STATES PATENTS 2,968,738     Pintell _____ Jan. 17, 1961

OTHER REFERENCES

Electronics, November 13, 1959, pages 96, 98, 99.